US010693526B2

(12) United States Patent
Levionnais et al.

(10) Patent No.: US 10,693,526 B2
(45) Date of Patent: Jun. 23, 2020

(54) DEVICE AND METHOD FOR WIRELESS COMMUNCATION

(71) Applicant: Orange, Paris (FR)

(72) Inventors: Philippe Levionnais, Caen (FR); David Picquenot, Authie (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/780,035

(22) PCT Filed: Nov. 24, 2016

(86) PCT No.: PCT/FR2016/053073
§ 371 (c)(1),
(2) Date: May 30, 2018

(87) PCT Pub. No.: WO2017/093639
PCT Pub. Date: Jun. 8, 2017

(65) Prior Publication Data
US 2018/0351604 A1    Dec. 6, 2018

(30) Foreign Application Priority Data

Nov. 30, 2015 (FR) ..................... 15 61583

(51) Int. Cl.
*H04B 5/00* (2006.01)
*H04B 13/00* (2006.01)

(52) U.S. Cl.
CPC ......... *H04B 5/0068* (2013.01); *H04B 13/005* (2013.01)

(58) Field of Classification Search
CPC .................................................. H04B 13/005
See application file for complete search history.

(56) References Cited

U.S. PATENT DOCUMENTS

2004/0152440 A1* 8/2004 Yoda .................... H04B 13/005
455/403
2006/0258408 A1* 11/2006 Tuomela .............. H04B 13/005
455/569.1
(Continued)

FOREIGN PATENT DOCUMENTS

WO    2006120582 A1    11/2006
WO    2008015627 A1    2/2008
WO    2012131224 A1    10/2012

OTHER PUBLICATIONS

International Search Report dated Feb. 24, 2017, for International Application No. PCT/FR2016/053073, filed Nov. 24, 2016.
(Continued)

*Primary Examiner* — David Bilodeau
(74) *Attorney, Agent, or Firm* — David D. Brush; Westman, Champlin & Koehler, P.A.

(57) ABSTRACT

A method for communicating on a terminal. The terminal is able to receive a message in a carrier radiowave by using the electromagnetic wave conduction capacities of a first channel, being supported by the body of a user carrying the terminal. The terminal is also able to communicate with a second device over a second wireless channel having a support separate from the body of the user. The method includes the following steps on the terminal: receiving, over the first channel, the first message including at least one item of peering data coming from another device; establishing a communication session over the second channel with the second device, using the item of peering data; and communicating with the second device only over the second radio channel.

7 Claims, 3 Drawing Sheets

(56) References Cited

U.S. PATENT DOCUMENTS

| | | | | |
|---|---|---|---|---|
| 2009/0309708 | A1* | 12/2009 | Hasegawa | H04B 5/0012 |
| | | | | 340/286.01 |
| 2011/0019717 | A1* | 1/2011 | Lim | H04B 13/005 |
| | | | | 375/132 |
| 2015/0163221 | A1* | 6/2015 | Bolin | H04W 76/14 |
| | | | | 726/7 |
| 2015/0242863 | A1* | 8/2015 | Sato | G06Q 30/02 |
| | | | | 705/7.29 |
| 2015/0253873 | A1* | 9/2015 | Sato | G09B 19/0038 |
| | | | | 345/156 |
| 2016/0239823 | A1* | 8/2016 | Bengtsson | G06F 1/163 |
| 2016/0294487 | A1* | 10/2016 | Bengtsson | H04B 13/005 |
| 2017/0093822 | A1* | 3/2017 | Gutierrez | H04B 13/005 |

OTHER PUBLICATIONS

English translation of the Written Opinion of the International Searching Authority dated Feb. 24, 2017, for International Application No. PCT/FR2016/053073, filed Nov. 24, 2016.

* cited by examiner

DEVICE AND METHOD FOR WIRELESS COMMUNCATION

CROSS-REFERENCE TO RELATED APPLICATIONS

This Application is a Section 371 National Stage Application of International Application No. PCT/FR2016/053073, filed Nov. 24, 2016, the content of which is incorporated herein by reference in its entirety, and published as WO 2017/093639 on Jun. 8, 2017, not in English.

FIELD OF THE DISCLOSURE

The invention relates to short-range wireless communications for the transmission of data between two devices via the human body. More specifically, the invention relates to a system for performing transactions between a handheld device and a base station, or reader, connected for example to a transactions server, by using the capacity of conductivity of the human body to transmit the electromagnetic waves carrying such wireless communications.

STATE OF THE ART

Near field communications, usually referred to by the acronym "NFC", based primarily on the ISO (International Standard Organization) standard 14443, use wireless technologies to allow an exchange of information between two devices separated by a short distance, typically less than ten centimeters. The communications of this type offer numerous applications, for example in the fields of payment and of transportation. The near field receiver receives a message from the near field transmitter. Such a message can correspond, in the abovementioned context, to the exchange of a ticket (event, transport, etc.), to the payment or to the validation of a transaction, etc.

A system is known from the prior art that allows such messages to be exchanged by using the capacity of conductivity of the human body to transmit the electromagnetic waves carrying such wireless communications.

The international patent application published under the number WO2012/131224 describes a communication system comprising a handheld transmitting device whose antenna is directly in contact with, or very close to, the user, here called the "carrier". The signal is modulated by means of a low-frequency modulator and transmitted through the body of the user. It is in fact known that the human body exhibits conduction capacities suitable for conveying such electromagnetic signals provided that the antenna is situated in the proximity of (at less than a few centimeters from) the body of the user and designed so as to provide the expected objective; to this end, it is composed of a set of turns, the number and disposition of which are suitable for optimally transmitting the wave through the human body. Hereinbelow, an NFC device equipped with such an antenna will be called "Bodypass" device, in reference to the validation of a communication through the human body. This system according to the prior art also comprises a receiver which comprises a receiving surface consisting of at least one antenna of the same type as that of the transmitter and on which the user can place the hand. The receiving device receives the signal by virtue of the physical contact, or at least the proximity, of the user with the antenna. The received signal is demodulated and transmitted to the appropriate equipment item to perform the processing operations, in this case to implement the transaction (payment, opening a door, etc.). This equipment item will hereinafter be called "base station", or more simply "reader", or even "terminal", "electronic payment terminal (EPT)", etc. The system described comprises a single transmission and reception channel, in this case the antenna, which, by virtue of a switch, can operate alternately in transmission mode and in reception mode. Such an architecture ensures the bidirectionality of the exchanges, necessary to the progress of the transaction.

Although this architecture allows the carrier to keep his or her portable device in a pocket, a bag, etc., it is restrictive: he or she must wait for the transaction to end before moving away from the reader. This waiting time can be fairly long because the bit rate for data exchanged in such a system is relatively slow in the current state of the art. The user has to stand in physical proximity to the reader, while keeping for example one hand on the receiving surface, and therefore does not have the hands free for the duration of the transaction.

The invention offers a solution that does not present the drawbacks of the state of the art.

SUMMARY

To this end, according to a functional aspect, the invention relates to a communication method on a first device, called terminal, capable of receiving a message in a radio carrier wave by using electromagnetic wave conduction capacities of a first channel whose medium is the body of a user carrying the terminal and of communicating with a second device on a second wireless channel having a medium distinct from the body of the user, characterized in that it comprises the following steps on the terminal:

reception, on the first channel, of the first message including at least one first pairing datum originating from another device;

establishing of a communication session on the second channel with said second device, using said pairing datum;

communication with said second device on the second channel.

According to the invention, two phases are run in sequence on the terminal transparently for the user, in order to render the service. First of all, a contactless phase of Bodypass type, which can be considered as a pre-pairing, is initiated by an external device, or reader. A radio carrier wave is transmitted from the reader through the body of a user carrying the terminal. Naturally, this transmission can take place only if the user is located with his or her terminal in proximity to the reader, since the communications of Bodypass type as described above can be accomplished only when the user is very close (of the order of a few centimeters) to the reader.

Typically, he or she places his or her hand on the receiving surface comprising the Bodypass antenna of the reader.

The terminal is typically a cellphone (smartphone) equipped with a "Bodypass" type antenna as defined previously, and situated for example in one of the pockets of the user, in his or her bag, etc. The user is therefore not necessarily in direct contact with the terminal, but on the other hand he or she has to be in the immediate proximity within the terms of reference of a carrier wave communication (a few centimeters). In other words, the user is not forced to touch the terminal. In particular, he or she is not obliged to touch a specific zone of the terminal. Moreover, the terminal can be insulated from the carrier by a layer of fabric, etc. Galvanic insulation does not prevent the communication.

The reader is typically a terminal equipped with an antenna of "Bodypass" NFC type capable of transmitting a message carried by a wave. This carrier wave carries a message modulating the carrier wave, for example of "I_AM_A_BODYPASS_REQUEST", or more simply "BODYP", type.

Pairing, or mating, should be understood to mean all the operations that allow two devices (here the terminal and the reader) to recognize one another in order to communicate with one another on a given communication channel, here called second communication channel.

The message transmitted by the reader also contains a pairing datum, for example an unknown, useful for establishing a communication on the second channel. The aim of this message is for example to invite the user to enter into contact with a reader in order to debit a ticket which is located on his or her terminal and to open the gate in a public transport system, or to debit a certain amount on the terminal, in the context of a financial transaction. According to this system, the user can thus keep his or her mobile terminal in a pocket or a bag without taking it out to offer it up to the reader; all he or she conventionally has to do is come close enough to place his or her hand on the antenna or brush it.

Advantageously according to the invention, the terminal is also capable of transmitting or receiving a message on a second channel, preferably wireless, which does not use the conduction capacities of the body of the user. This channel can be any type of wireless communication channel (typically, radio) known to the person skilled in the art. In a second phase, that can be considered as an actual pairing phase, following the pre-pairing, this communication channel is open between the two devices, the terminal and the reader.

Thus, the user may or may not be in contact with the reader at the time of the communication on the second channel. Advantageously, the user can therefore quickly move away from the reader after having entered into contact in the first pre-pairing phase, since all the subsequent exchanges with the reader are conveyed by a traditional radio channel which does not use his or her body (WiFi, Bluetooth, etc.), and whose range is greater than that of the Bodypass (or of the NFC).

Advantageously, on this second channel, the user can benefit from a higher bit rate than that offered by a standard Bodypass communication. In addition, this second channel can offer enhanced security in the exchanges.

The sequencing of these two steps on the two different channels therefore allows the user to benefit from the service, for example payment service, while never having taken the terminal out of his or her pocket, and while nevertheless freely moving away from the reader as soon as the initial phase of pre-pairing with the reader, on Bodypass, is completed.

It will also be noted that the terminal has to be capable of receiving messages on the first Bodypass channel but does not transmit them on this same channel, only on the second channel. The reception is done in accordance with the abovementioned application WO2012/131224. Advantageously, the absence of transmission of such a carrier wave reduces the risks for the health of the carrier.

According to a particular implementation of the invention, a communication method as described above is further characterized in that the establishing of said communication session with the second device includes a step of transmission of a second message including at least one second pairing datum on the second channel, said second pairing datum being a function of the first pairing datum.

Advantageously according to this embodiment of the invention, after the terminal of the user has received, via the Bodypass channel, the message including the pairing datum, it uses the second channel to transmit, in return to the reader, a message which contains a second pairing datum generated from the first pairing datum (it can be the same datum, for example an unknown). This datum allows the reader to recognize the datum that it transmitted previously in the first message and to conventionally establish a two-way communication between the two devices, paired on the second channel, to exchange the service data. This method particularly conforms to a certain number of standards, such as the Bluetooth standard for example, a short-range network technology allowing devices to be linked together wirelessly.

According to a second particular implementation of the invention, which will be able to be implemented alternatively or together with the preceding one, a communication method as defined above is further characterized in that the first message also includes a service identifier.

Advantageously according to this mode, several Bodypass services can be offered to the user via his or her terminal. If the terminal has, for example, a Bodypass transport application and a Bodypass payment application, the reception of an identifier of the service by the terminal makes it possible to select a service out of the two, for example the transport service, by launching, on the terminal, a dedicated application (transport-dedicated in this case) charged with transmitting the second message to the reader on the second channel and then the subsequent operations associated with the service.

According to a hardware aspect, the invention relates also to a communication device, called terminal, capable of receiving a message in a radio carrier wave by using electromagnetic wave conduction capacities of a first channel whose medium is the body of a user carrying the terminal, comprising the following modules:
  a communication module capable of receiving a message in a radio carrier wave by using electromagnetic wave conduction capacities of a first channel whose medium is the body of the user;
  a transceiver module capable of communicating, on a second wireless channel having a medium distinct from the body of the user, with a second device, called reader;
characterized in that the communication on the second channel is activated following the detection of a pairing datum in a message carried by the radio carrier wave received by the terminal when the user is in proximity to the reader.

The term module can correspond equally to a software component and to a hardware component or a set of hardware and software components, a software component itself corresponding to one or more computer programs or subprograms or, more generally, to any element of a program capable of implementing a function or a set of functions as described for the modules concerned. Similarly, a hardware component corresponds to any element of a hardware assembly capable of implementing a function or a set of functions for the module concerned (integrated circuit, chip card, memory card, etc.).

According to another functional aspect, the invention relates also to a communication method between:
  a first device, called terminal, capable of receiving a message in a radio carrier wave by using electromagnetic wave conduction capacities of a first channel whose medium is the body of a user carrying the terminal and of communicating on a second wireless channel having a medium distinct from the body of the user, and a second device, called reader, capable of transmitting a message in a radio carrier wave on the first channel and of communicating with the terminal via the second channel, characterized in that it comprises the steps of:

transmission by the reader, on the first channel, of a message comprising at least one pairing datum;

establishing of a communication session on the second channel between the terminal and the reader, using said pairing datum;

communication between the two devices on the second channel.

It will be noted that any market-standard reader can advantageously be used, provided that it has the Bodypass option. The option simply involves an updating of the software of the reader.

According to another hardware aspect, the invention relates also to a communication system comprising:

a first device, called terminal, comprising:

a communication module capable of receiving a message in a radio carrier wave by using electromagnetic wave conduction capacities of a first channel whose medium is the body of a user carrying the terminal;

a transceiver module capable of communicating on a second wireless channel having a medium distinct from the body of the user;

a second device, called reader, comprising a communication module capable of transmitting a message in a radio carrier wave on the first channel;

a transceiver module capable of communicating with the terminal on the second wireless channel;

characterized in that the communication on the second channel is activated following the detection of a pairing datum in a message carried by the radio carrier wave received by the terminal when the user is in proximity to the reader.

According to a functional aspect, the invention relates also to a program that can be loaded into the memory of a terminal device, the program comprising code portions for the execution of the steps of the communication method on the terminal according to the invention, when the program is executed on said terminal device.

According to a functional aspect, the invention relates also to a program that can be loaded into the memory of a reader device, the program comprising code portions for the execution of the steps of the method according to the invention, when the program is executed on said reader device.

The invention relates also to a partially or totally removable data medium, comprising program code instructions for the execution of the steps of the methods according to the invention.

BRIEF DESCRIPTION OF THE DRAWINGS

Many details and advantages of the invention will be better understood on reading the description of a particular embodiment with reference to the attached drawings given in a nonlimiting manner and in which.

DETAILED DESCRIPTION OF ILLUSTRATIVE EMBODIMENTS

Figure 1:
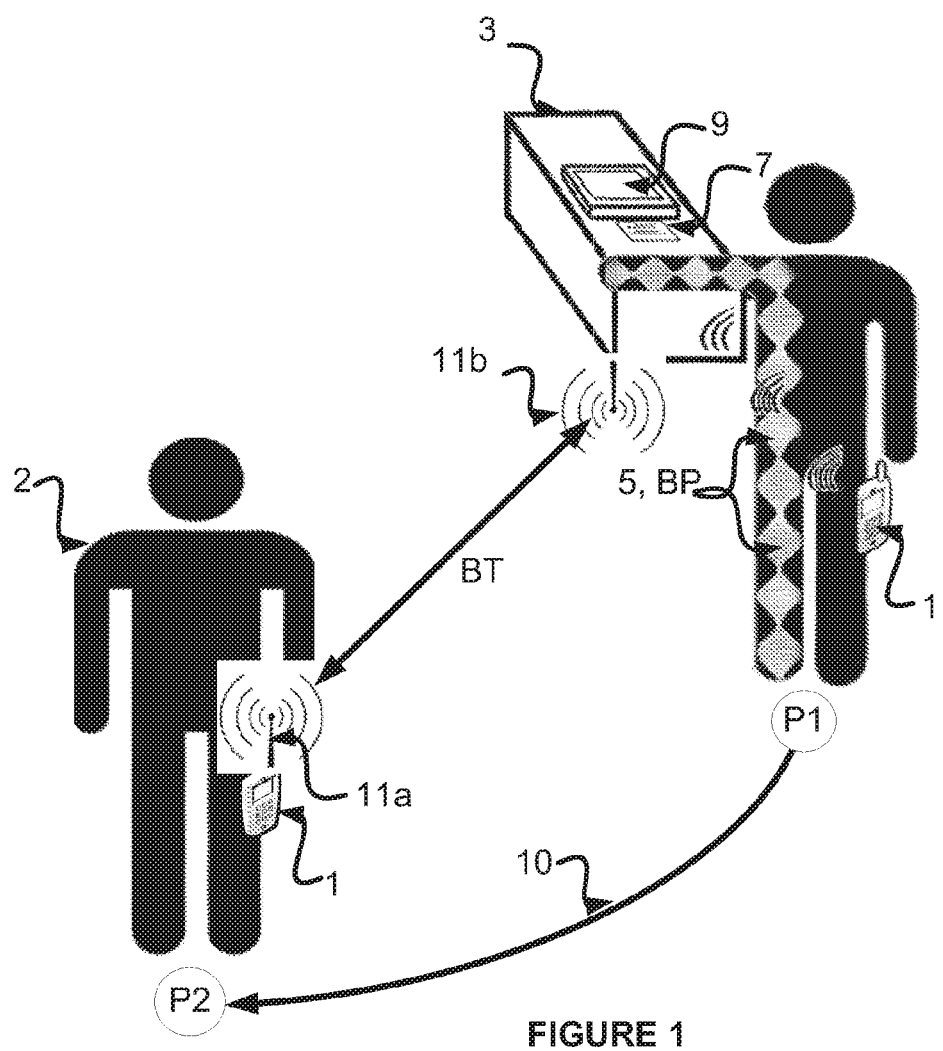
FIG. 1 represents a wireless communication system according to an embodiment of the invention when the user of the terminal invokes a service from a reader.

FIG. 1 represents a wireless communication system according to an embodiment of the invention when a user (2) carrying a handheld device (1), hereinafter called terminal, equipped with a "Bodypass" module as defined previously, nears a reader, or EPT (electronic payment terminal) during a monetary transaction. Naturally, any other example of service could be illustrated, for example a transaction of "ticket validation" type. In this case, the reader could take for example the form of a gate allowing the user to pass when the transaction is validated.

The user (2), or carrier (of the terminal), is for example a human being but could alternatively take the form of another living being suitable for transmitting radio carrier waves.

The terminal (1) according to the invention is a handheld device naturally capable of receiving radio carrier waves, via an antenna, through the body of the user (2). To this end, the terminal (1) is situated in proximity to the user (2), without necessarily being in direct contact therewith. For example, the terminal (1) is placed inside a pocket or a bag carried against the user. In these configurations, it is estimated that the terminal (1) is not more than a few centimeters away from the body of the user (2). The distance is for example less than 10 cm. The terminal (1) is equipped with a battery or cells, for standalone operation. It is according to this example a mobile terminal equipped with a "Bodypass" antenna (not represented) used to receive the modulated electrical signals in the form of an electromagnetic wave. This antenna does not need to be configured in transmission, which limits the risks to the health of the carrier. In the context of this exemplary embodiment, and as already explained previously, the "Bodypass" antenna is designed so as to optimally receive the electromagnetic wave through the human body; to this end, it consists of a set of turns of appropriate number and disposition. Such an antenna is described in the abovementioned application WO2012/131224. The handheld terminal (1) is capable, according to this example, of receiving electromagnetic waves through the body of the user when the latter is located in a first position P1 in proximity to the reader.

The reader (3) is an equipment item capable of transmitting radiofrequency signals, or carrier waves, through the body of the user, via a "Bodypass" antenna (7). In this exemplary embodiment, the reader (3) is a conventional EPT which comprises a receiving surface consisting of the antenna (7), protected as necessary and adapted to react when the user brushes it or enters into contact therewith, for example by placing the hand on top. The term "surface" is in no way limiting and given by way of illustration, the antenna being the only means essential to the operation of the Bodypass. The reader according to this example (3) also comprises a user interface (9), also called IHM, intended to display messages for the attention of the user and to receive data, for example via a numeric keypad, and an equipment item (not represented in FIG. 1) capable of performing processing operations related to the transaction, such as a PC or a server. The receiving surface covering the antenna, the user interface and the equipment item are connected for example by means of a wired link, or through a network, for example a mobile network, or the Internet network.

The user (2) is for example in a store and wants to pay for a purchase via the merchant's EPT. According to another example, he or she could be in a public transport system and use a virtualized transport ticket service; he or she would have bought a certain number of transport tickets whose rights would be inscribed on his or her cellphone, and he or she would have to use up a ticket to be able to use the transport means, that is to say open the gate of the reader (3) associated with the transport.

It will be noted that the terminal (1) can potentially perform direct NFC transactions if it is offered up to the terminal but that it is more advantageous to use "Bodypass" transactions via the body of the user since this avoids the need for him or her to take the terminal from his or her pocket, his or her bag, etc., which offers both great freedom of movement and advantageous security (against theft, dropping, etc. of the terminal). Advantageously according to the Bodypass technology, he or she can leave the telephone in his or her pocket and establish a manual contact with the terminal. It is recalled that this communication system, using the properties of the human body to conduct certain types of waves, and in particular but without limitation the radio signals of NFC type, is described for example in the patent application published under the number WO2012/131224. The Bodypass signal (5, BP) is represented schematically in FIG. 1 as passing through the human body in the form of a wave.

The terminal (1) and the reader (3) also conventionally have radio modules (respectively 11a, 11b) which allow them to communicate according to a known wireless communication protocol, Bluetooth or Wi-Fi for example. It is recalled that Bluetooth is a short-range network technology making it possible to link devices to one another wirelessly. Bluetooth allows data or voice to be transmitted between equipment items equipped with radio modules, over a radius of the order of ten meters to a little less than a hundred meters and with low electrical consumption. The Bluetooth used in this exemplary embodiment is preferably of Bluetooth low energy, or BLE, type, characterized by a very low consumption and an operating distance of the order of a meter (three or four at most), which is sufficient for the type of transactions targeted. The term Wi-Fi for its part covers a set of standards of the IEEE 802.11 specification for wireless communications that can range up to a few tens of meters. In the context addressed here, the user carrying the terminal proceeds in two phases:

In a first stage, which corresponds to a "pre-pairing" phase, the user approaches the reader (3) and places his or her hand on the receiving surface comprising the antenna (7); he or she is located in a position 1 (denoted P1); the Bodypass application installed on the reader (1) transmits an initial message. For example, a "BODYP" message is transmitted in the form of a modulated signal to signify "I am a reader awaiting a Bodypass type application". According to this embodiment, the message also comprises a datum which can be for example an unknown (that is to say a random value) generated by the reader for the subsequent establishing of a communication; the modulated signal (5) carrying the "BODYP" message and the unknown is conveyed by the body of the user to his or her terminal (which is located for example in his or her pocket), demodulated, possibly decoded and analyzed.

In a second stage, which corresponds to a phase of pairing between the terminal and the reader, the user removes his or her hand from the reader and can move to switch to a position P2. His or her movement is symbolized by the arrow 10. It will be noted that this movement is optional but that it is not very agreeable to remain in contact with the reader if there is no need to do so, and that the user will likely prefer to have the hands free. The terminal (1), if the analysis of the message received previously is correct, initiates the transaction. To do this, it proceeds with a pairing with the reader. It transmits a radio message using a transmission module schematically represented in the figure by an antenna (11a), on a communication channel distinct from that used for the first exchange. It is, according to this example, a channel of Bluetooth (BT) type. The message is received on the Bluetooth channel by the reader. According to this example, it carries the unknown which was supplied to the terminal by the reader in the preceding phase; the reader, recognizing its unknown, accepts the communication. Conventionally, a communication session is opened between the two paired devices. The latter can then exchange all the data necessary for establishing, continuing and concluding the transaction (dispensing money, a ticket, etc.).

This exemplary embodiment has been given by way of illustration and is in no way limiting.

In particular, the message transmitted by the terminal on the radio channel conveys, according to this example, the unknown which was supplied in Bodypass by the reader. This example is not limiting. In particular, the unknown can be modified before insertion into the message, according to any method available to the person skilled in the art, from the moment that the reader is capable of recognizing the datum that it transmitted in order to perform the pairing. In the context of a "standard" Bluetooth communication, the "master" device (here the reader) sends a random number to the "slave" device (here the terminal). The slave returns its Bluetooth address (a Bluetooth device has a unique address, like the MAC address of network cards. This address is formed by 48 bits: the first three bytes identify the manufacturer, the next three are those assigned to the device). From this random number, from the Bluetooth address (denoted @MAC for reasons of simplicity) and possibly from a code of PIN type (entered on both devices), an encryption key is computed for the exchange of the messages between the master and the slave.

Thus, the initial phase of sending the random number is performed via the Bodypass technology (pre-pairing) on the first channel in near field mode, then the other operations (pairing and subsequent communication) are performed on the second channel in Bluetooth mode, in a totally standard manner.

Alternatively, any other communication of "wireless" type could be used (wireless link of Wi-Fi, DECT, Zigbee, etc. type), even a wired link, from the moment that the channel used does not exploit the properties of conduction of the body of the user (2) and therefore does not oblige it to remain in immediate proximity to the reader. Advantageously, the second channel makes it possible to benefit from a higher bit rate than that offered by a Bodypass communication and can offer additional security in the exchanges.

Also, many other examples of services can be implemented according to the principles stated above, particularly in the field of transport, as already mentioned. According to another example, the user wants to rent a car; in this case, the reader can be located in the handle of the door of the car, or in the lock, etc. At the time of rental, a specific application can be delivered to the mobile terminal of the user by the car rental agent; at the time of taking the vehicle, this application is "woken up" by the pre-pairing phase described previously, when the user offers the hand up to the handle of the car. The mobile terminal can remain in his or her pocket. The pre-pairing phase is followed by a pairing phase during which the application woken up transmits a pairing message (comprising for example the unknown received in the pre-pairing and the MAC address of the terminal) on a Bluetooth link. If the pairing is successful, that is to say if the reader of the car recognizes the unknown and accepts the terminal, the door opens and the user can be connected by Bluetooth to the onboard computer of the car. At no time has he or she taken the terminal from his or her pocket, and he or she has remained in proximity to the handle only during the pre-pairing stage.

Figure 2:
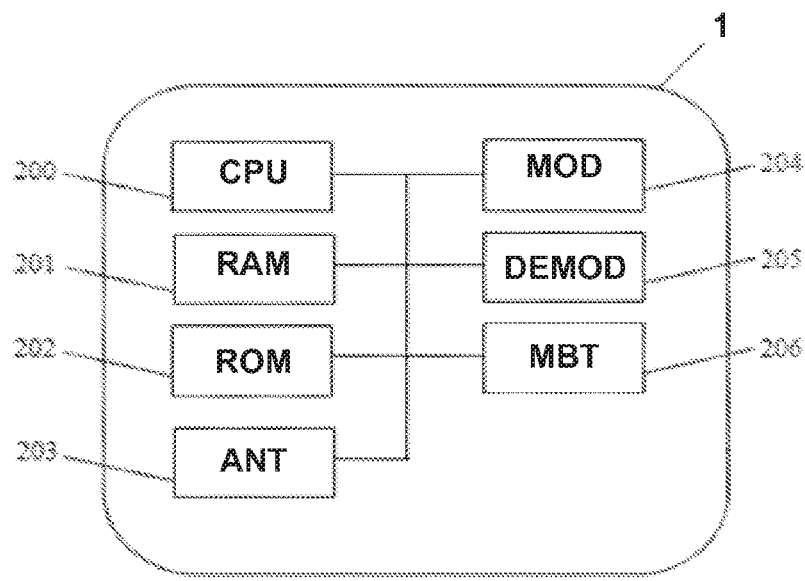
FIG. 2 represents an exemplary embodiment of a terminal device according to an embodiment of the invention.

A terminal device 1 according to the invention will now be described in relation to FIG. 2. The terminal (1) is for example a mobile terminal of smartphone type suitable for implementing the invention. According to another example, the terminal is a simple electronic card equipped with the following modules:

- a processing unit 200, or "CPU" (central processing unit), intended to load instructions into memory, to execute them, to perform operations;
- a set of memories, including a volatile memory 201, or "RAM" (random access memory) used to execute code instructions, store variables, etc.;
- a non-volatile memory 202, of "ROM" (read only memory) or "EEPROM" (electronically-erasable programmable read only memory) type intended to contain persistent information. In the case of a ticketing service, this memory can be used to store the ticket balance; in the case of an electronic wallet service, the cash balance.
- a "Bodypass" antenna (ANT) 203 suitable for receiving signals on the radio channel and via the human body;
- a demodulator (DEMOD) 205, intended to receive, via the antenna 203, a modulated electrical signal and to transform it into a digital signal intended to be transmitted to the processing unit 200. The demodulator 205 is arranged to implement the demodulation step E1 of the communication method described hereinbelow;
- it will be noted that the presence of a modulator (MOD) 204 (intended to adapt, if necessary, a digital signal produced by the microprocessor 200 into a modulated electrical signal, intended to be transmitted via the antenna 203) is not necessary in our exemplary embodiment since the terminal does not transmit data in "Bodypass" mode but could be useful according to certain variant implementations;
- a Bluetooth module (MBT) 206, intended to transmit and receive data on a Bluetooth channel established with an external device capable of communicating according to this standard, in this case the reader. The MBT module is in particular arranged to implement the step E2 of transmission of a message to the reader (3) and the steps E3 and E4 of reception/transmission of messages relating to the transaction on the Bluetooth channel, as will be detailed with the support of FIG. 4. The Bluetooth module is linked to the antenna, either directly or via the cellphone:
    In the first case, the Bluetooth module is located for example on a substrate (called "Bodypass component") combining all the modules necessary to the Bodypass operation (antenna, demodulator, microprocessor, etc.). It is linked to the output of the antenna demodulator, possibly via other circuits. It receives the data demodulated and possibly processed by a microprocessor, and is responsible for establishing the Bluetooth communication channel. Advantageously in this case, all the modules can be grouped together on the same physical and/or logical entity (Bodypass-Bluetooth circuit, component, etc.), and supported for example by an electronic card that the user can carry in his or her pocket.
    In the second case, the Bluetooth module is located elsewhere, for example in the terminal. The demodulated antenna signals are transmitted to the microprocessor of the terminal which is responsible for establishing the Bluetooth communication with the reader. Advantageously in this case, the Bluetooth module that is natively present on the terminal (a smartphone for example) can be reused.

Figure 3:
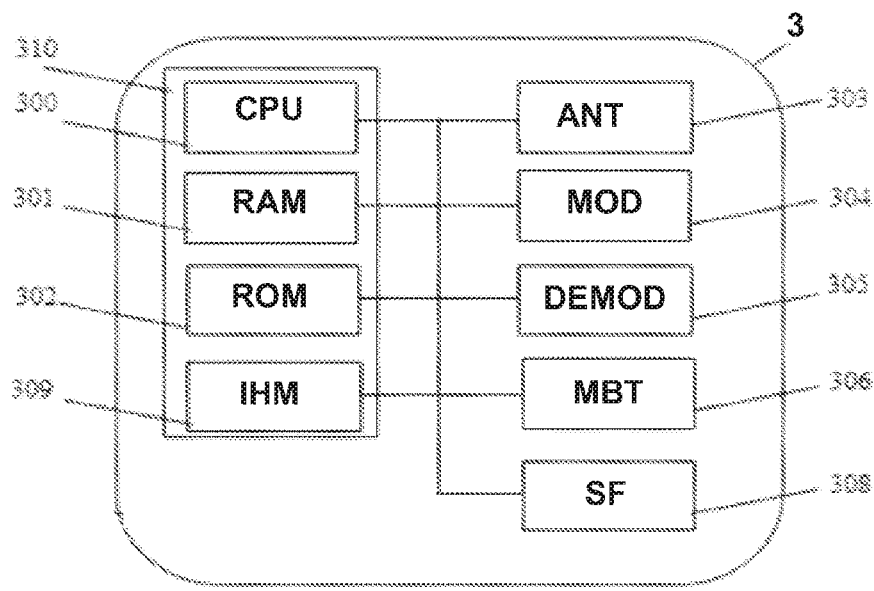
FIG. 3 represents an exemplary embodiment of a reader device according to an embodiment of the invention.

A reader (3) according to the invention (also commonly called "EPT", or "terminal") will now be described in relation to FIG. 3. The reader comprises several modules which are similar to those of the handheld device 1 described in relation to FIG. 2:

- a processing unit 300, or "CPU", intended to load instructions into memory, to execute them, to perform operations,
- a set of memories, including a volatile memory 301, or "RAM" (random access memory) used to execute code instructions, store variables, etc.,
- a non-volatile memory 302, of "ROM" or "EEPROM" type intended to contain persistent information;
- a "Bodypass" antenna (ANT) 303 suitable for transmitting signals on the radio channel and via the human body;
- a modulator 304 intended to adapt a digital signal produced by the microprocessor 300 into a first modulated electrical signal, intended to be transmitted, via the antenna 303, through the body of the user. The modulator 304 is arranged to implement the initial step E21 of transmission of the "BODYP" message described previously; the modulation operation performed by the modulator 304 is an on or off amplitude modulation, also called "OOK" (on-off keying) modulation. Thus, for example, the signal is an on or off amplitude-modulated 13.56 MHz signal. The invention is not however limited to this type of modulation. In another exemplary embodiment, the modulation is a frequency modulation, less sensitive to interference. It is noted that this embodiment is however more costly because it requires more components. In another exemplary embodiment, a phase modulation is performed;
- the presence of a demodulator 305 is not necessary in the context of the embodiment of the invention;
- a receiving surface (SF) 308 suitable for reacting in proximity to the user (contact, quasi-contact, brushing, etc.). In the example described here, this surface corresponds to the antenna 303, so that a modulated electrical signal transmitted or received via the antenna 303 is capable of being conveyed by the body of the user which is in contact with the surface. In an exemplary embodiment, the antenna 303 can be incorporated in the surface 308. The surface is arranged so as to cooperate with the processing unit 300 to implement the steps of the method which will be described later;
- a Bluetooth module 306 (MBT) intended to transmit and receive data on a Bluetooth channel established with an external device capable of communicating according to this standard, in this case the mobile terminal. The module 304 is in particular arranged to implement the steps E23 and E24 of reception/transmission of messages relating to the transaction on the Bluetooth channel;

a user interface (IHM) 309, suitable for transmitting to the user instructions or information messages. For example, the user interface 309 is a screen on which the messages and instructions are displayed. In another exemplary embodiment, the interface 309 is an audio interface making it possible to play the messages and instructions. The IHM can also comprises a keyboard, a microphone, etc. The user interface 309 is arranged to implement in particular the invitation step E20 of the communication method.

The reader 3 is less constrained in terms of power supply and of size than the terminal 1. Thus, the processing unit 300, volatile 301 and non-volatile 302 memories and user interface 309 modules are, in an exemplary embodiment, incorporated in a computer 310 of PC or server type which can be powered by the mains. The computer 310 is interfaced with the components (surface (SF) 308 coupled to the antenna 303, demodulator 305, etc.) for example by means of a wired interface.

It will be noted that any market-standard reader can advantageously be used, provided that it has the Bodypass option, an option simply involving an updating of the software of the reader equipped with a Bodypass antenna, to make it capable of transmitting a message having the Bodypass characteristics (frequency, modulation, etc.) via its antenna.

Figure 4:
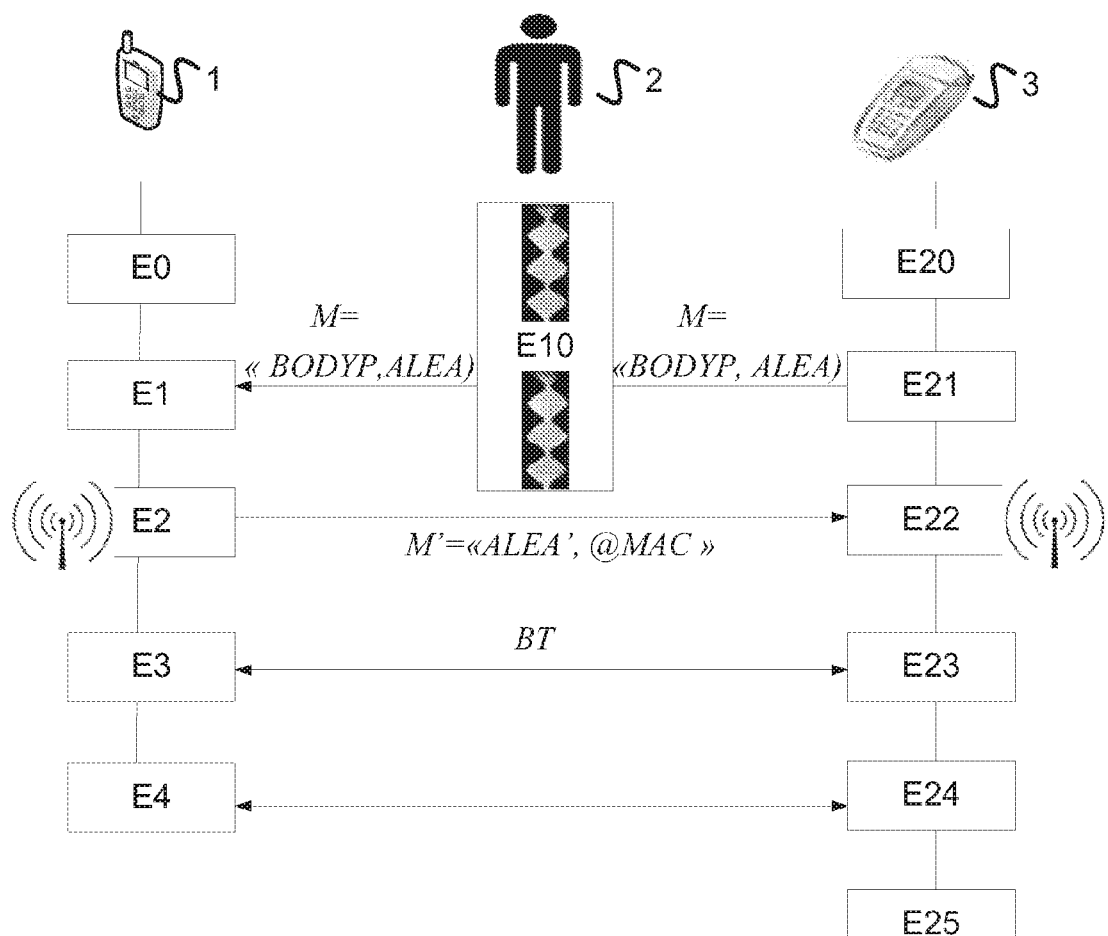
FIG. 4 represents the steps of a method between the terminal and the reader according to an embodiment of the invention.

FIG. 4 represents the steps of a bidirectional wireless communication method through the human body between a cellphone (1) equipped with a "Bodypass" antenna carried by a user (2), and a EPT (reader, 3) equipped with a "Bodypass" antenna, that are capable of also establishing a Bluetooth communication channel so as to free the hand of the user.

In an initial invitation step E20, the reader (3) possibly displays a message on the screen: amount of a transaction, prompt to place his or her hand on the receiving surface to validate a transport ticket, etc.

The user (2) equipped with the handheld device (1) approaches the reader and possibly reads the message. The user has set his or her mobile device in an appropriate state (Bluetooth and Bodypass active) in an initial step E0.

During a transmission step E21, the reader 3 transmits, via its antenna, a modulated electrical signal associated with a search message intended for a device situated in proximity, in this case the terminal (1) carried by the user (2). The search message transmitted in the modulated electrical signal transmitted by the reader (3) is intended according to this example to enter into contact with a handheld device situated in proximity to the reader (3). It is specific to the service and can include a service identifier. More specifically, the search message comprises a plurality of information elements intended to be transmitted continuously for a certain period during which the EPT (3) is in transmission mode. For example, the information element consists of a word, "BODYP", transmitted several times in the first modulated electrical signal, followed by a pairing datum, for example an unknown (ALEA) which will make it possible to perform a subsequent pairing phase, followed optionally by an identifier of the service.

In a next step E1, the user 2 places his or her hand on the "Bodypass" antenna of the base station 3; the first modulated electrical signal transmitted during the preceding step is detected and received by the terminal (1). In effect, the user (2) whose hand is placed on the Bodypass antenna of the reader is a vector of transmission of the first electrical signal transmitted by the reader (3). The terminal (1), hitherto in waiting state, or receiving state, detects and receives the modulated electrical signal (M) conveyed by the body of the user. The terminal (1) demodulates the first electrical signal received into a first digital signal and initiates the Bluetooth communication. According to another embodiment, a BLE module is located in direct contact with the demodulator connected to the Bodypass antenna, and it is not necessary to use the Bluetooth function of the terminal, even if it does exist. In this case, a microprocessor associated with the demodulator of the Bodypass antenna can for example take over the detection of the message and the processing thereof.

At the end of this step, the user can move away from the EPT, the pre-pairing phase being finished. The first channel (Bodypass) can be closed. This closure is preferably implicit: as soon as the user moves away from the terminal, the transmission channel can no longer convey signals and the transmission is interrupted. This step is optional inasmuch as the user can, if he or she wishes, remain close to the terminal, with the hand placed on top, but this is of no benefit in the context of this embodiment since the pre-pairing phase is finished. If the channel consisting of the body of the user remains open, no data will nevertheless pass therethrough anymore.

In a step E2, the digital message associated with the response (schematically represented in the figure by M'="ALEA', @MAC") is transmitted via the antenna (11a) of the terminal (1) on a Bluetooth radio channel.

In a detection and reception step E22, the message (M') transmitted during the preceding step E2 by the handheld device (1) and transmitted in Bluetooth mode is detected and received by the reader (3).

If the message received is correct (here, it is the message M' including the unknown, and possibly the MAC-Bluetooth address of the terminal), the reader can accept the Bluetooth communication with the terminal; the bidirectional Bluetooth channel is established in a step E3 (and corresponding E23). The two devices are now paired on the Bluetooth channel and can communicate.

The steps E4 and E24 are steps of reception/transmission of messages relating to the transaction on the Bluetooth channel (to validate a purchase whose amount is displayed on the terminal, a ticket balance, or exchange any other message required for the communication, etc.).

It will be noted that, according to the prior art, the user must keep the hand placed on the receiving surface of the reader from the step E1 of establishing contact between the user and the reader (3) until the end of the communication step, which is tedious. Advantageously, he or she can here remove the hand and even move away from the EPT without in any way interrupting the communication which continues over the Bluetooth channel.

The step E25 corresponds to the end of the transaction (for example, validation of the monetary transaction, opening of the gate, etc.).

The Bluetooth channel can be closed.

It goes without saying that the embodiment which has been described above has been given in a purely indicative and in no way limiting manner, and that many modifications can easily be made by the person skilled in the art without in any way departing from the scope of the invention.

It is recalled in particular that the embodiment presented conforms to the example of a mobile terminal of smartphone type, natively equipped with a Bluetooth module, but also to that of an electronic card or any other terminal device having the required capabilities (Bodypass and Bluetooth).

In the case of the mobile terminal of smartphone type, two embodiments can be envisaged without departing from the context of the invention:

- according to the first embodiment, the output of the demodulator associated with the Bodypass antenna is connected (via a set of suitable components) to a radio module of Bluetooth type (notably BLE) which is independent of that of the mobile device. Advantageously, the abovementioned components can be arranged on the same substrate, called "Bodypass component", driven for example by a microprocessor or microcontroller responsible for establishing the BLE communication with the reader device;
- according to a second embodiment, the output of the demodulator associated with the Bodypass antenna is connected (via a set of suitable components) to the mobile device, responsible for establishing the Bluetooth communication between its own Bluetooth module and the reader device.

Although the present disclosure has been described with reference to one or more examples, workers skilled in the art will recognize that changes may be made in form and detail without departing from the scope of the disclosure and/or the appended claims.

The invention claimed is:

1. A communication method on a first device, called a terminal, capable of receiving a first message in a radio carrier wave by using electromagnetic wave conduction capacities of a first channel whose medium is the body of a user carrying the terminal and of communicating with a second device over a second wireless channel having a medium distinct from the body of the user, wherein the method comprises the following acts on the terminal:
   receiving, on the first channel, the first message including at least one first pairing datum originating from the second device when the user enters a proximity of the second device;
   establishing a communication session on the second channel with said second device, using said pairing datum;
   communicating with said second device only on the second radio channel, independently of reception of data on the first channel.

2. The communication method as claimed in claim 1, wherein the establishing of said communication session with the second device includes transmitting a second message including at least one second pairing datum on the second channel, said second pairing datum being a function of the first pairing datum.

3. The communication method as claimed in claim 1, wherein the first message also includes a service identifier.

4. A communication device, called a terminal, capable of receiving a first message in a radio carrier wave by using electromagnetic wave conduction capacities of a first channel whose medium is the body of a user carrying the terminal, the communication device comprising:
   a communication module configured to receive the first message in a radio carrier wave by using electromagnetic wave conduction capacities of a first channel whose medium is the body of the user, the first message originating from a second device, called a reader, when the user enters a proximity of the reader;
   a transceiver module configured to communicate, on a second wireless channel having a medium distinct from the body of the user, the reader;
   wherein the communication on the second channel is activated following detection of a pairing datum in the first message carried by the radio carrier wave received by the terminal when the user is in proximity to the reader.

5. A communication method between:
   a first device, called terminal, configured to receive a first message in a radio carrier wave by using electromagnetic wave conduction capacities of a first channel whose medium is the body of a user carrying the terminal and of communicating on a second wireless channel having a medium distinct from the body of the user, and
   a second device, called a reader, configured to transmit the first message in the radio carrier wave on the first channel and of communicating with the terminal via the second channel,
   wherein the method comprises:
   transmitting by the reader, on the first channel, the first message comprising at least one pairing datum when the user enters a proximity of the reader;
   establishing a communication session on the second channel between the terminal and the reader, using said pairing datum;
   communicating between the first and second devices only on the second channel, independently of reception of data on the first channel.

6. A communication system comprising:
   a first device, called a terminal, comprising:
      a communication module configured to receive a first message in a radio carrier wave by using electromagnetic wave conduction capacities of a first channel whose medium is the body of a user carrying the terminal;
      a transceiver module configured to communicate on a second wireless channel having a medium distinct from the body of the user;
   a second device, called a reader, comprising:
      a communication module configured to transmit the first message in the radio carrier wave on the first channel;
      a transceiver module configured to communicate with the terminal on the second wireless channel;
      wherein the communication between the first device and the second device on the second channel is activated following detection of a pairing datum in the first message carried by the radio carrier wave received by the terminal from the reader when the user enters a proximity of the reader.

7. A non-transitory computer-readable medium comprising a computer program stored thereon, which includes code instructions which, when is executed by a processor of a terminal, configure the terminal to perform a communication method, the terminal being capable of receiving a first message in a radio carrier wave by using electromagnetic wave conduction capacities of a first channel whose medium is the body of a user carrying the terminal and of communicating with a second device over a second wireless channel having a medium distinct from the body of the user, wherein the communication method comprises the following acts on the terminal:
   receiving, on the first channel, the first message including at least one first pairing datum originating from the second device when the user enters a proximity of the second device;
   establishing a communication session on the second channel with said second device, using said pairing datum;

communicating with said second device only on the second radio channel, independently of reception of data on the first channel.

* * * * *